United States Patent [19]

Prange et al.

[11] 4,089,559

[45] May 16, 1978

[54] VEHICLE SEAT

[76] Inventors: Bernard H. Prange, 1006 Easy St.; Gerald P. Fignar, 8 Red Fox La., both of Burkburnett, Tex. 76354

[21] Appl. No.: 722,666

[22] Filed: Sep. 13, 1976

[51] Int. Cl.² .......... B62J 1/00

[52] U.S. Cl. .......... 297/201

[58] Field of Search .......... 297/201, 200, 312; 272/96, 73

[56] References Cited

U.S. PATENT DOCUMENTS

| | | | |
|---|---|---|---|
| 604,347 | 5/1898 | Bray | 297/201 |
| 2,021,801 | 11/1935 | Meyer | 272/96 X |
| 2,206,902 | 7/1940 | Kost | 272/96 X |
| 3,487,829 | 6/1970 | Barnett | 272/96 |

FOREIGN PATENT DOCUMENTS

| | | | |
|---|---|---|---|
| 912,602 | 10/1972 | Canada | 272/96 |
| 358,585 | 2/1906 | France | 297/201 |
| 96,983 | 3/1896 | Germany | 297/201 |
| 91,361 | 3/1896 | Germany | 297/201 |
| 827,008 | 11/1951 | Germany | 297/201 |
| 22,116 of | 1897 | United Kingdom | 297/201 |
| 11,426 of | 1896 | United Kingdom | 297/201 |
| 10,068 of | 3/1900 | United Kingdom | 297/201 |

*Primary Examiner*—James T. McCall

*Attorney, Agent, or Firm*—Hubbard, Thurman, Turner, Tucker & Glaser

[57] ABSTRACT

An improved vehicle seat for a vehicle propelled by leg action of the rider includes a seat portion that is divided into a right half and a left half. Both halves of the seat portion are pivotally affixed to a seat post that is adapted to be rigidly affixed to the vehicle. The front portions of the right half and the left half of the seat are adapted to move upwardly and downwardly. A suitable coupling apparatus engages the right half and the left half of the seat whereby the front portions of the right half and the left half of the seat move upwardly and downwardly simultaneously in opposite directions relative to each other as the rider propels the vehicle.

5 Claims, 11 Drawing Figures

21
18
20
19
28
27
17
26
24
25
12
13

18
29
21
16
20
28
17
25
26
24
10
15
13
11
12
14

19
21
20
29
27
18
17
24
28
25
26
13
12

21
18
20
19
27
28
17
26
24
25
12
13

VEHICLE SEAT

BACKGROUND OF THE INVENTION

This invention relates to an improved vehicle seat. In another aspect, this invention relates to an improved vehicle seat for a vehicle propelled by the leg action of the rider. In still another aspect, this invention relates to an improved vehicle seat adapted to support a rider in a sitting position with the legs of the rider being firmly supported, as the rider manipulates his legs to propel the vehicle by peddling action.

Vehicles such as bicycles, tricycles and the like, are widely used for recreational and exercise purposes. Such vehicles normally are propelled by the leg action of the rider whereby the rider places his feet on peddles which are affixed to cranks on a circular crank wheel which, in turn, is operably connected to one of the wheels of the vehicle. Thus, by a cranking motion exerted by the legs of the rider, the vehicle can be propelled. Normally, the rider of the vehicle is seated on a vehicle seat or saddle in a straddle-like fashion with a portion of the vehicle seat extending between the legs of the individual and with only a small portion of the buttocks area of the rider being supported by the vehicle seat or saddle.

As the rider of the vehicle propels the vehicle by a cranking or peddling motion, the upper leg or thigh portion of the rider is pivoted at the hip joint and the knees of the rider move upwardly and downwardly as the vehicle is peddled. Such an upward and downward movement of the legs, while the rider is supported only on a small portion of the saddle extending between his legs, is quite uncomfortable and painful in some instances. This discomfort and pain is especially noticed by elderly riders or by riders who have undergone some physical injury to their leg and hip areas. Unfortunately, the vehicle seats now in use do not solve the problem of adding support to the rider in the buttocks area, as well as in the thigh area. The generally accepted solution for making a vehicle seat more comfortable to the rider has been in the addition of padding. However, even with the addition of padding, there has been no effort made to reshape a vehicle seat such that the rider is supported over a wide area of the buttocks or over any portion of the upper rearward portion of the thighs.

It is, therefore, apparent that there is a need for an improved vehicle seat for vehicles propelled by leg action of the rider. It is also apparent that there is a need for an improved vehicle seat that will support the rider over a large area of the buttocks and the upper rearward portion of the thighs.

SUMMARY OF THE INVENTION

Accordingly, it is an object of this invention to provide an improved vehicle seat. It is another object of this invention to provide an improved vehicle seat for a vehicle propelled by leg action of the rider. It is still a further object of this invention to provide an improved vehicle seat whereby the rider of the vehicle can be more comfortably supported as the rider propels the vehicle by leg action.

Other aspects, objects and advantages of this invention will be apparent to those skilled in the art from the following description and appended claim.

In the instant invention, a vehicle seat suitable for use on vehicles wherein the rider propels the vehicle by leg action includes a seat post means adapted to be rigidly affixed to the vehicle. The seat post means supports a right and a left body support means that are adapted to comfortably support the rider by supporting the rider over a wide area of the buttocks and rear upward portion of his thighs. The right and left body support means are pivotally affixed to the seat post means along the rear portion of the right and left body support means. The pivotal attachment of the right and left seat support means thus allows the front portion of the right and left body support means to move upwardly and downwardly. A coupling means operably engages the right and left seat support means in such a manner that movement of the front portion of either the right or left portion of the seat support means upwardly or downwardly results in a simultaneous movement of the front portion of the other in an opposite direction. As the rider of the vehicle peddles the vehicle and his thighs are pivoted about the hip joint, the right and left portions of the body support means will pivotally follow and support the buttocks and the upper rearward portions of the thighs as the peddling cycle is carried out.

DESCRIPTION OF PREFERRED EMBODIMENTS

Figure 1:
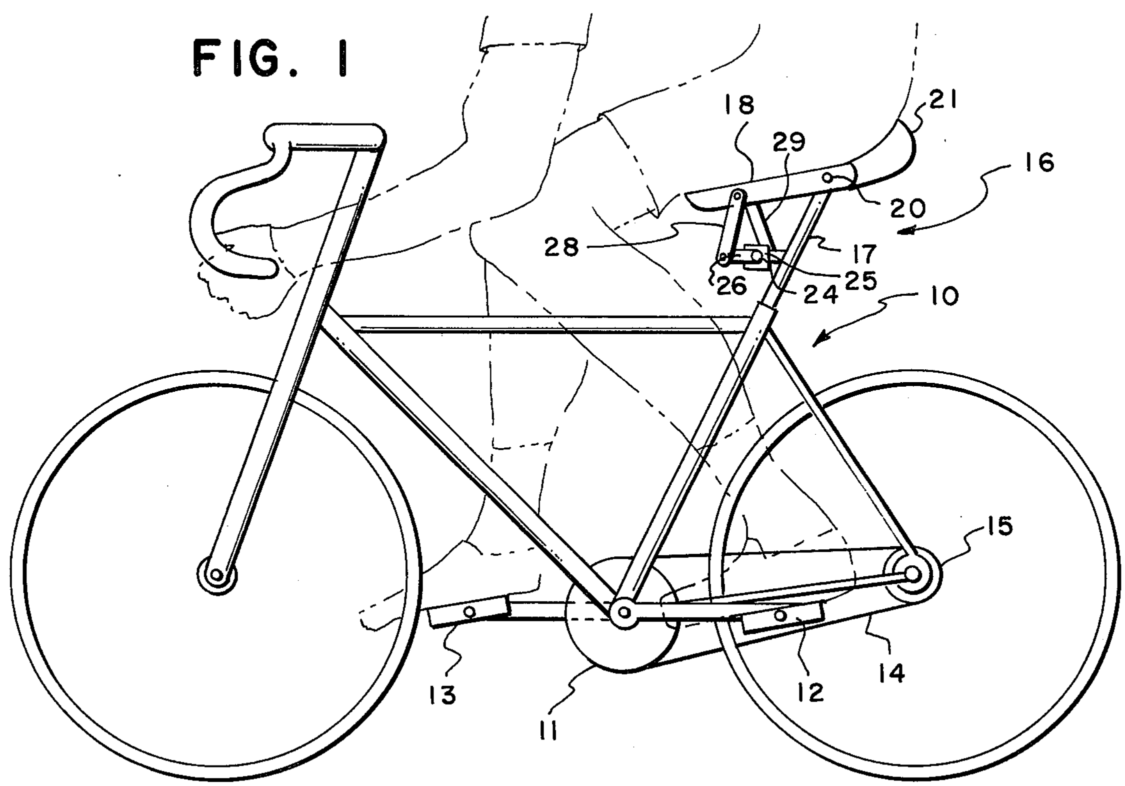
FIG. 1 is a side view (from the left side) of a portion of a bicycle equipped with the apparatus of this invention and showing the phantom outline of a rider seated on the improved vehicle seat.

The preferred embodiments of this invention can best be described by referring to the drawings. While several different figures are presented to illustrate some of the preferred embodiments of the invention, those elements that are common to the various embodiments illustrated in the individual figures will be referred to by the same numerical designation.

As illustrated in FIG. 1, a conventional bicycle 10 is equipped with sprocket wheel 11 having left peddle 12 and right peddle 13 operably affixed thereto. As in most conventional bicycles, chain 14 fits over the sprocket teeth of sprocket wheel 11 and runs to rear sprocket 15 which is operably connected to the rear wheel of the bicycle. Thus, by rotating sprocket wheel 11, by means of cranking left and right peddles 12 and 13, the bicycle can be propelled by the leg action of the rider. As shown in FIG. 1, left and right peddles 12 and 13 are in a near horizontal plane such that the knees of the rider of the bicycle (shown by phantom lines) are at substantially the same level above the ground.

Vehicle seat 16 of this invention is affixed to the frame of bicycle 10 by any suitable means, such as by U-bolts, a compression sleeve arrangement and the like. Vehicle seat 16 includes a seat post means 17 that is utilized to rigidly affix vehicle seat 16 to the bicycle and to support the various other essential elements of the vehicle seat.

Supported by seat post 17 are left body support means 18 and right body support means 19. As will be more fully described hereinafter, left and right body support means 18 and 19 are pivotally affixed to seat post means 17 whereby the front portions of left and right body support means 18 and 19 may move upwardly and downwardly about pivot shaft 20. Generally, the improved vehicle seat of this invention will also include a rear body support means 21 that extends across the back portion of the vehicle seat to add support to the rider of the vehicle. Normally, rear body support means 21 will be rigidly affixed to seat post 17 and will not move as the rider propels the vehicle. Rear support means 21 is optional and may not be included in some of the other preferred embodiments of this invention.

It should be noted that the improved vehicle seat of this invention does not necessarily incorporate a vehicle seat wherein a portion of the seat protrudes between the legs of the rider. Instead, the vehicle seat of this invention utilizes a rather large left and right body support means 18 and 19 that will support a substantial portion of the buttocks area and the upper rear thigh area of the rider. Thus, the rider is comfortably supported and seated on a rather large platform-like area, defined by the upper surface of left and right body support means 18 and 19, as well as rear body support means 21. While reference is made to a rather large seat area in the description of the invention, the seat halves can be of any desired size and still provide improved support and comfort to the rider.

Figure 3:
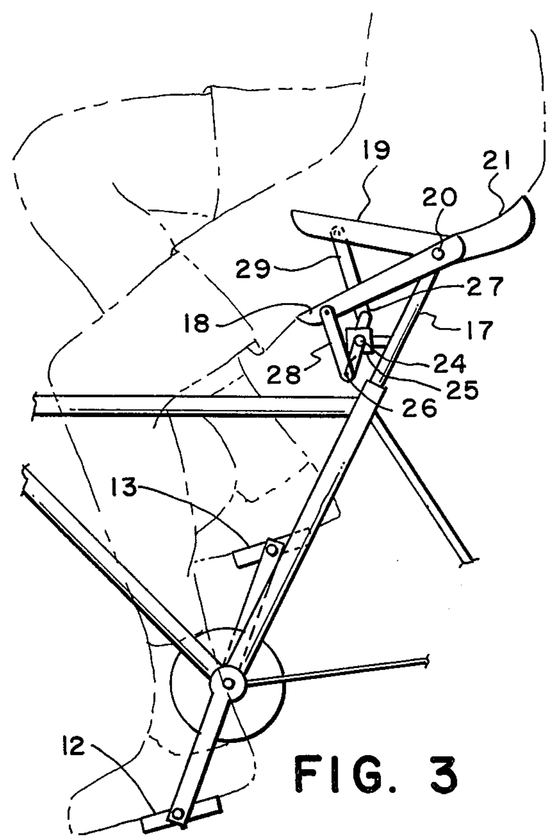
FIG. 3 is a side view of the portion of the bicycle of FIG. 1 showing yet another orientation of the peddles and the body support means of the improved seat of this invention.
Figure 2:
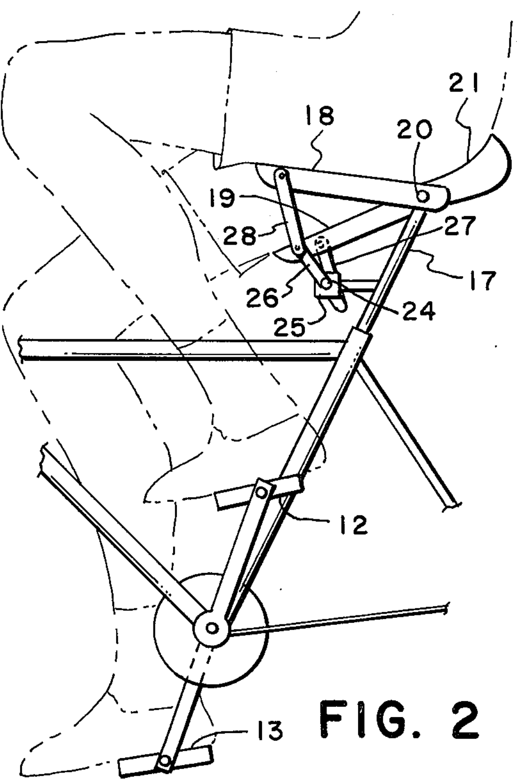
FIG. 2 is a side view of a portion of the bicycle of FIG. 1 with the peddles of the bicycle and body support means in a different orientation.

As previously mentioned, left and right body support means 18 and 19 are pivotally affixed to seat post 17 whereby the front portions of each of the body support means 18 and 19 may move upwardly and downwardly. By means of a suitable coupling device, as hereinafter defined, the front portions of left and right body support means 18 and 19 move upwardly and downwardly, about pivot shaft 20 simultaneously and in opposite directions. As illustrated in FIG. 1, the front portions of left and right body support means 18 and 19 are in a near-horizontal alignment by virtue of the fact that left and right peddles 12 and 13 are in a near-horizontal plane. As the rider cranks sprocket wheel 11 by depressing the peddles, right peddle 13 will be rotated downwardly as left peddle 12 rises, as illustrated in FIG. 2. As right peddle 13 is depressed by the leg action of the rider, the right thigh portion of the rider will pivot about the right hip joint whereby the right thigh will move downwardly in a horizontal direction and the left thigh of the rider will move upwardly and pivot about the left hip joint. As the rider continues to crank sprocket wheel 11 by means of leg action, left peddle 12 will be depressed while right peddle 13 rises in a horizontal plane, as illustrated in FIG. 3.

As a result of the action of the coupling means, as hereinafter described, left and right body support means 18 and 19 will follow and support the upper rear thigh portions of the rider during the peddling motions wherein the right and left thigh portions of the riders pivot about the right and left hip joints. Thus, the improved vehicle seat of this invention will provide continuous support of the rider during the peddling motions. By virtue of the continuous support of the rider while the rider is seated on the rather large, platform-like structure of the instant vehicle seat, substantially all of the discomfort normally associated with conventional vehicle seats will be removed. It will be appreciated that the amount of upward and downward movement of the front portions of each of left and right body support means 18 and 19 can be and should be adjusted to very closely follow, or mimic, the upward and downward movement of the upper rear portion of the thighs of the rider. Such movement can be adjusted by suitable adjustments or sizing of the coupling mechanism, as will hereinafter be discussed.

Figure 4:
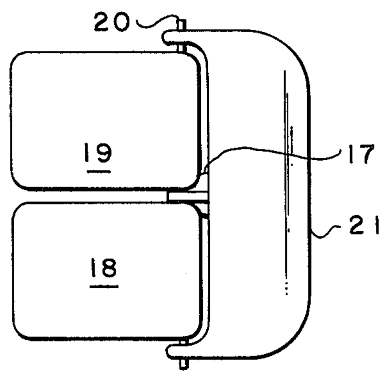
FIG. 4 is a top view of one preferred embodiment of this invention.
Figure 5:
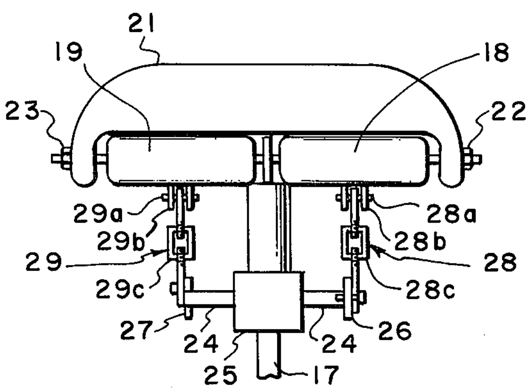
FIG. 5 is a front view of the seat of FIG. 4 (viewing from the left to the right in FIG. 4)
Figure 6:
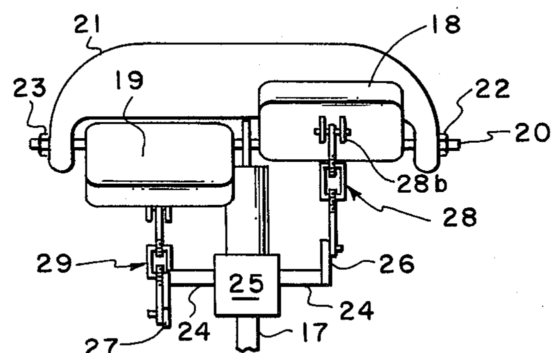
FIG. 6 is a front view of the vehicle seat of FIG. 4 showing the seat halves in a different orientation than in FIG. 5.

The coupling means that engage both the right and left body support means of the invention are adapted to limit and control the movement of the front portions of the left and right body support means whereby they will move upwardly and downwardly, simultaneously, in opposite directions. The left and right body support means are pivotally affixed to seat post 17 by any suitable means. One suitable means is by pivot shaft 20 that passes through and supports the rear portion of left and right body support means 18 and 19. Such pivot shaft 20 can be adapted to be inserted through a suitable sleeve that extends through the rear portion of left and right body support means 18 and 19. Other suitable means for pivotally affixing left and right body support means 18 and 19 to seat post 17 can be utilized, such as hinges, flexible straps and the like. As more clearly illustrated in FIGS. 4 and following, one preferred embodiment utilizes pivot shaft 20 that passes through the rear portions of both left and right body support means 18 and 19 and is operably supported by seat post 17. Suitable means, such as cotter keys, pins, nuts, and the like, can be utilized to restrain and prevent left and right body support means 18 and 19 from slipping off the ends of pivot shaft 20. As illustrated in FIGS. 5 and 6, retaining nuts 22 and 23 can be screwed onto threaded terminal portions of pivot shaft 20 to prevent the seat support means 18 and 19 from sliding off the ends of the pivot shaft.

The pivot point about which left and right body support means 12 and 13 pivot about has been illustrated as being near the rear portion of such body support means. While this may be one preferred location of the pivot point, it can be located at other positions along the length of the body support means such as at points between the front and rear edges of such body support means.

It will be appreciated that, in some instances, it may be desired to shape body support means 18 and 19, as well as rear body support means 21 to conform to the general contours of the buttocks and the rear thigh portions of the user. Thus, rear body support means 21 will normally be curved upwardly in a saddle-like configuration to support the rider. It will also be appreciated that additional comfort can be gained by padding the body support means with some suitable resilient material, such as foamed rubber, hair, or other suitable padding material. Normally, body support means 18, 19 and 20 will be covered with some flexible covering material, such as leather, plastic or the like. In some instances, it may be desired to use one continuous sheet of covering material to cover all of the seat surface that supports the rider. In such instances, it will be necessary to utilize a relatively flexible, pliable sheet material for such covering. As illustrated, however, the left and right body support means 18 and 19, as well as rear body support means 21, are covered separately.

The upward and downward simultaneous movement of the front portions of left and right body support means 18 and 19 in opposite directions is controlled by suitable coupling means. The coupling means will engage the left and right body support means such that movement of the front portion of one of the body support means will result in the simultaneous movement of the front portion of the other body support means in an opposite vertical direction.

FIGS. 1 through 6 illustrate only one of the preferred embodiments of the invention wherein the coupling means includes crank levers that are affixed to the ends of a common shaft with the ends of the crank levers being operably connected to the left and right body support means through suitable connecting rod elements. As illustrated in FIGS. 5 and 6, coupling shaft 24 extends through a suitable bushing housing 25, which is either rigidly affixed to or is an integral part of seat post 17. Coupling shaft 24 freely rotates within bushing housing 25. Rigidly affixed to the left end of coupling shaft 24 is left crank lever 26 and, on the right end of coupling shaft 24, is rigidly affixed right crank lever 27. Left and right crank levers 26 and 27 are disposed in opposite directions along the axis of coupling shaft 24. Left connecting rod 28 operably connects the underside of left body support means 18 with left crank lever 26 and right connecting rod 29 operably connects the underside of right body support means 19 with right crank lever 27. The location of the connection point of left and right connecting rods 28 and 29 with relation to pivot point 20 may be adjustable whereby the connection point can be moved either farther away or closer to the pivot point, depending on the relative thigh length of the rider. Any suitable means can be utilized for such adjustment. For example, pins *28a* and *29a* for attaching the upper ends of connecting rods 28 and 29 to the underside portions of body support means 18 and 19 can be moved forward or rearward from pivot shaft 20 by means of a series of spaced apart apertures along the length of downward facing flanges *28b* and *29b*.

Suitable adjustment means may also be incorporated in left and right connecting rods 28 and 29 to adjust the effective length of such connecting rods. As more fully illustrated in FIGS. 5 and 6, turn buckles *28c* and *29c* can be incorporated in left and right connecting rods 28 and 29 whereby the effective length of the connecting rods can be adjusted by merely manipulating the turn buckles. Normally, the effective length of connecting rods 28 and 29 are adjusted to either a shorter or longer length, depending on the relative length of the shins of the rider. Thus, by proper adjustment of the lengths of the connecting rods 28 and 29 and by adjusting the distance between their connection points and pivot point 20, the seat can be utilized to give improved and comfortable support to the rider, no matter what the lengths of the riders' shins and thighs may be. In some instances, it may be desirable to incorporate springs in connecting rod linkages 28 and 29. Such springs can be used for at least partial compensation of the effective length of the linkages to aid in providing an even and uniform support of riders having shins and thighs of differing lengths.

Left and right connecting rods 28 and 29 can be operably connected to the underside portion of left and right body support means 18 and 19 and to left and right crank levers 26 and 27 by means of suitable pins that are inserted through apertures in the ends of left and right connecting rods 28 and 29 whereby the pins are free to rotate within the apertures as the front portions of left and right body support members 18 and 19 are moved upwardly and downwardly and as coupling shaft 24 rotates within bushing housing 25.

In the operation of the vehicle seat illustrated in FIGS. 1 through 6, as left body support means 18 moves upwardly to follow the upper rear portion of the thigh of the rider, left connecting rod 28 moves upwardly to thereby rotate left crank lever 26 upwardly. Since left crank lever 26 is rigidly affixed to coupling shaft 24, coupling shaft 24 will also rotate and, by virtue of right crank lever 27 being affixed to the other end of coupling shaft 24, right crank lever 27 will be rotated downwardly since it is disposed on the opposite side of the axis of coupling shaft 24. As right crank lever 27 rotates downwardly, right connecting rod 29 will cause right body support means 19 to move downwardly as it is pivoted about pivot shaft 20. This action is accomplished as right peddle 13 moves upwardly. As right peddle 13 moves downwardly and left peddle 12 moves upwardly, the cycle is reversed whereby left body support means 18 moves upwardly, thereby causing left connecting rod 28 to rotate left crank lever 26 upwardly. Again, since left crank lever 26 is rigidly affixed to coupling shaft 24, rotation of coupling shaft 24 will take place to thereby cause oppositely disposed right crank lever 27 to rotate downwardly. As right crank lever 27 rotates downwardly, right connecting rod 29 also moves downwardly to thereby pull, or force, right body support means 19 to pivotally rotate downwardly. Thus, it will be appreciated that the peddling action of the rider will cause the front portions of left and right body support means 18 and 19 to simultaneously move upwardly and downwardly in opposite directions to follow the general orientation of the left and right peddles 12 and 13, which are affixed to sprocket wheel 11. Since the left and right upper rearward portions of the thighs of the riders are also pivotally and simultaneously moving upwardly and downwardly in right directions, it will be seen that the upper surface of left and right body support means 18 and 19 mimic, or follow, the movements of the rear portions of the thighs of the rider.

As previously mentioned, suitable adjustment means, such as turn buckles *28c* and *29c* can be incorporated into left and right connecting rods 28 and 29 to increase or decrease the effective length of such connecting rods. By properly adjusting the effective length of these connecting rods, the vehicle seat can be adapted to move upwardly and downwardly at precisely the right distance to accommodate a rider having differing shin lengths, i.e., the distance between the knees and the ankles of the rider.

The effective length of left and right crank levers 26 and 27 can also be adjusted by merely increasing or decreasing the length of the crank by any known means, such as by equipping left and right crank levers 26 and 27 with a series of apertures wherein the connecting pins to the appropriate connecting rods can be moved inwardly or outwardly from the axis of coupling shaft 24. Such adjustment can be utilized to compensate for differing radii of rotation of peddies 12 and 13 on sprocket wheel 11.

Figure 7:
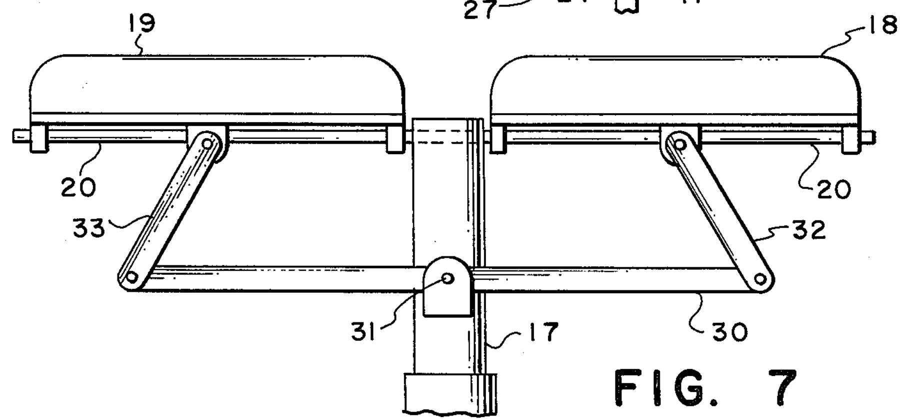
FIG. 7 is the front view of the vehicle seat of this invention showing a cross bar coupling mechanism.

Other preferred embodiments of the coupling means of the instant invention are illustrated in FIGS. 7 through 11. In FIG. 7, a crossbar coupling means is illustrated that includes pivot shaft 20 being supported by the upper portion of seat post 17 whereby left and right body support means 18 and 19 can pivot about pivot shaft 20. Crossbar 30 extends across the underportion of the seat assembly and is pivotally affixed to and supported by seat post 17 at crossbar pivot pin 31, which is affixed to seat post 17. Crossbar 30 is free to pivotally rotate in a vertical direction about crossbar pivot pin 31. Left connecting link 32 is operably and pivotally affixed to the underside of left body support means 18 through a suitable pin mechanism and to the left end of crossbar 30, also through a suitable pivot pin arrangement. Likewise, right connecting length 33 is operably affixed to the underside of right body support means 19 and to the right end of crossbar 30. Normally, pivot pin 31 will be centered between the connecting points for attaching connecting links 32 and 33 to crossbar 30. In the operation of the coupling means illustrated in FIG. 7, as the front portion of left body support means 18 pivotally rotates downwardly about pivot shaft 20, left connecting link 32 moves downwardly, causing crossbar 30 to pivotally rotate about crossbar pivot pin 31 to thereby cause right connecting link 33 to move upwardly, thereby forcing the front portion of right body support means 19 to pivotally rotate upwardly about pivot shaft 20.

Figure 8:
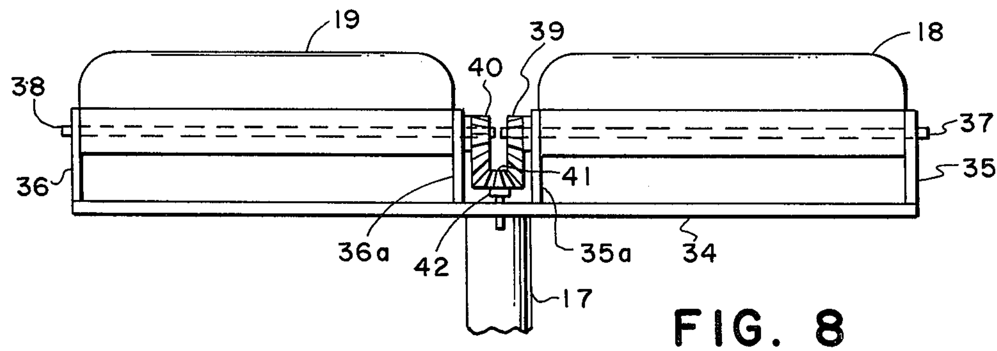
FIG. 8 is the front view of another vehicle seat of this invention showing a bevel gear coupling mechanism.

Another preferred embodiment of this invention is illustrated in FIG. 8 wherein a different coupling mechanism is illustrated. In FIG. 8, seat post 17 supports seat carriage support bar 34, which extends across the underside of the seat assembly. The outward ends of seat carriage support bar 34 turn upwardly with left support flange 35 extending upwardly from the left end of seat carriage support bar 34 and right support flange 36 extending upwardly from the right end of seat carriage support bar 34. In this embodiment of the invention, left and right seat support means 17 and 18 are rigidly affixed to support shafts 37 and 38. Support shafts 37 and 38 extend through the rear portion of left and right body support means and are journaled into suitable apertures in the upper portion of left and right support flanges 35 and 36 whereby the support shafts can be rotated as the front portions of left and right body support means 18 and 19 move upwardly and downwardly. Disposed along the portion of seat carriage support bar 34 near seat post 17 are left and right support flanges **35*a* and 36*a* which also include apertures through which the inside ends of left and right support shafts 37 and 38 can be journaled for rotation. Rigidly affixed to the inside ends of left and right support shafts 37 and 38 are bevel gears 39 and 40. Left and right bevel gears 39 and 40 will rotate as the front portions of left and right body support means 18 and 19 move upwardly and downwardly. Left and right bevel gears 39 and 40 are in mating arrangement with a third bevel gear 41 which is rotatably affixed to seat post 17. Thus, as the front portion of left body support member 18 moves downwardly, bevel gear 39 will rotate and, by virtue of its mating arrangement with third bevel gear 41, an opposite rotation will be effected in bevel gear 40, thereby causing the front portion of right body support member 19 to rotate upwardly. Bevel gear 41 can be rotatably secured to seat post 17 by means of suitable bevel gear shaft 42 which is journaled into a bushing contained within the center portion of bevel gear 41. In this embodiment, shafts 37 and 38 generally replace pivot shaft 20 as illustrated in FIGS. 1 through 7**.

Figure 9:
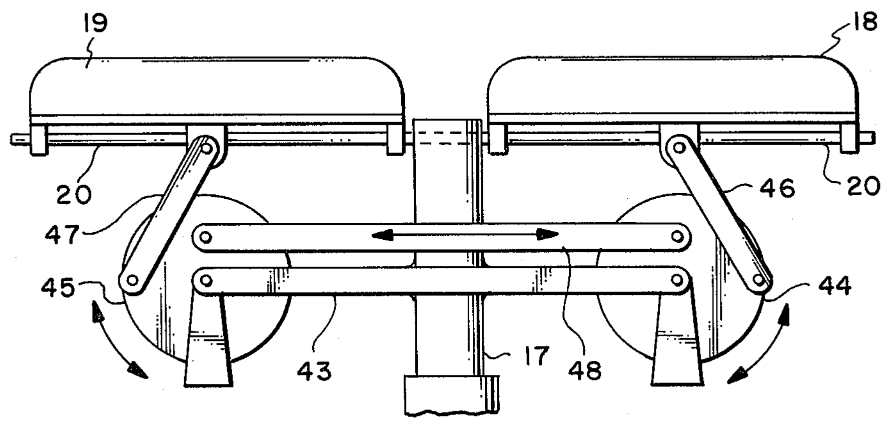
FIG. 9 is a front view of another improved seat of this invention showing a bell-crank and crossbar coupling mechanism.

Another preferred embodiment of this invention is illustrated in FIG. 9 wherein the coupling mechanism includes a bell crank arrangement with a crossbar connector. As noted in FIG. 9, seat post 17 supports pivot shaft 20 that extends along or near the back portions of left and right body support means and 19 whereby the front portions of left and right body support means may move upwardly and downwardly as they are pivoted about pivot shaft 20. Also rigidly affixed to seat post 17 is bell crank support member 43 that extends laterally across the underportion of the improved vehicle seat. Left bell crank 44 and right bell crank 45 are rotatably affixed to the ends of bell crank support member 43. Left and right bell cranks 44 and 45 can be rotatably affixed to the ends of the bell crank support member by any suitable means, such as by pins or axles journaled into suitable bushings within the ends of bell crank support member 43. Alternatively, outwardly extending pins or axles from the ends of bell crank support member 43 can be journaled into suitable bushings within the center portion of left and right bell cranks 44 and 45 to thereby enable them to rotate.

Left and right bell connecting links 46 and 47 are affixed to the underside portions of left and right body support means 18 and 19 by means of suitable pins that are inserted through apertures in one end of each of the bell connecting links whereby the links do have some pivotal movement about such pins. The other end of left and right bell connecting links 46 and 47 are rotatably affixed to the peripheral portion of left and right bell cranks 44 and 45 whereby any upward and downward movement of left and right body support means 18 and 19 will cause a rotation in left and right bell cranks 44 and 45. As illustrated in FIG. 9, left bell crank 44 is affixed to left bell connecting link 46 at a point most distant from seat post 17. Right bell connecting link 47 is affixed to right bell crank 45 also at a point most distant from seat post 17. Both of the bell connecting links are affixed to their respective bell cranks by a pin mechanism that can be inserted through a suitable aperture in the ends of the bell connecting links whereby movement of the bell connecting link upwardly or downwardly will cause rotation in the bell cranks.

Bell crank crossbar 48 extends across and beneath left and right body support means 18 and 19 with the ends pivotally affixed to each of left and right bell cranks 44 and 45. Bell crank crossbar 48 can be affixed to the outer periphery of left and right bell cranks 44 and 45 through a conventional pin arrangement whereby outwardly extending pins from the periphery of the bell cranks can be inserted into bushings in the ends of bell crank crossbar 48 or the crossbar can have outwardly extending pins that can be inserted into suitable apertures in the periphery of the bell cranks.

In the operation of the connecting link assembly illustrated in FIG. 9, as the front portion of left body support means 18 moves downwardly, left bell connecting link 46 will also move downwardly, causing left bell crank 44 to rotate in a clockwise direction, as viewed in FIG. 9. As left bell crank 44 rotates in a clockwise direction, bell crank crossbar 48 moves toward the right, thereby causing right bell crank 45 to also rotate in a clockwise direction, resulting in an upward movement of right bell connecting link 47, which will, of course, cause the front portion of right body support means 19 to simultaneously move upwardly. The movement of the components is, of course, reversed when the rider of the vehicle starts to depress his right leg, thereby causing the front portion of right body support means 19 to move downwardly while the front portion of left body support means 18 moves upwardly.

Figure 10:
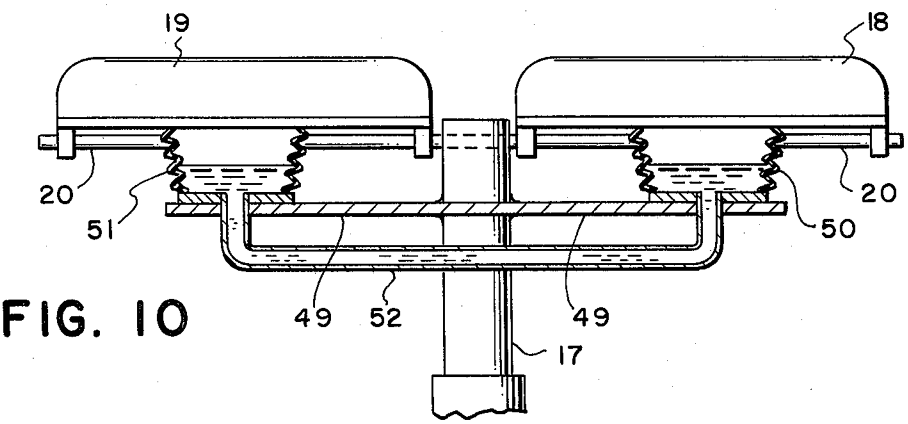
FIG. 10 is a front view of another vehicle seat of this invention showing a fluid filled bellows coupling mechanism.

FIG. 10 illustrates another preferred embodiment of the invention wherein the connecting link assembly is a fluid-filled bellows arrangement. As shown in FIG. 10, left and right body support means 18 and 19 are pivotally supported by seat post 17 through pivot shaft 20. Bellows support member 49 is rigidly affixed to seat post 17 and extends across the underportion of the vehicle seat to support left bellows assembly 50 and right bellows assembly 51. Fluid conduit 52 is in open communication with the interior portions of left and right bellows assemblies 50 and 51. The bellows assemblies can be fabricated of any suitable material such as heavy, reinforced rubber or plastic or the like. The bellows and the fluid conduit assembly are in sealed relationship with each other whereby a fluid contained within the sealed assembly is free to move back and forth from one bellows chamber to another, depending upon the amount of force exterted on each of the bellows. The working fluid within the sealed bellows and fluid conduit assembly can be any suitable fluid that can move back and forth; however, it is preferred to utilize a liquid such as water, ethylene glycol, and the like. In the operation of the vehicle seat illustrated in FIG. 10, as the front portion of left body support means 18 moves downwardly, it contacts the upper portions of left bellows assembly 50 and, by virtue of left bellows support assembly 50 being supported by bellows support member 49, the fluid contained therein is forced out of the bellows assembly and through fluid conduit 52, thereby causing it to enter right bellows assembly 51. As the fluid enters right bellows assembly 51, the action of the fluid within the bellows will cause the front portion of right body support means 19 to move upwardly since the lower portion of right bellows assembly 51 is also rigidly supported by bellows support member 49. As the rider of the vehicle then starts to depress his right leg and cause the front portion of right body support means 19 to move downwardly, the cycle is reversed with the fluid from sealed bellows assembly 51 to exit through fluid conduit 52 and be transported to right bellows assembly 51 whereby the front portion of right body support means 18 will move upwardly.

Figure 11:
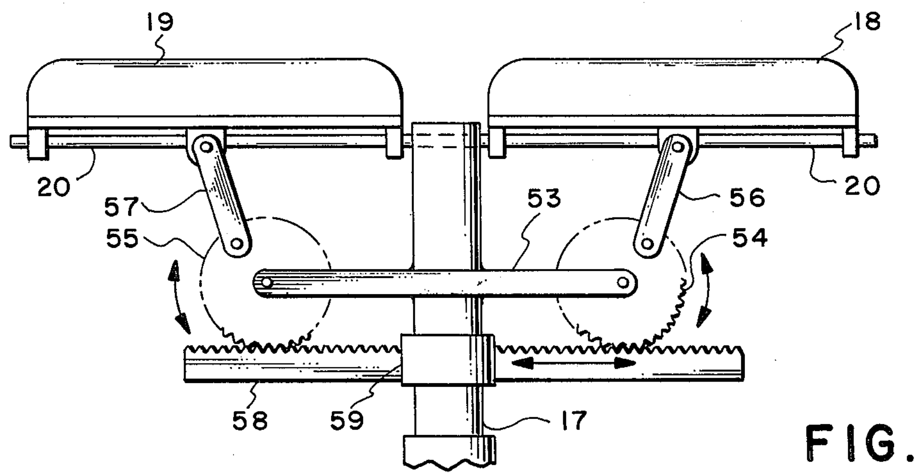
FIG. 11 is a front view of another improved seat of this invention with a spur-gear and sliding rack coupling mechanism.

Still another preferred embodiment of this invention is illustrated in FIG. 11 wherein a spur-gear-sliding rack mechanism is utilized as the coupling means. In the vehicle seat illustrated in FIG. 11, seat post 17 supports pivot shaft 20 at or near the rear portions of left and right body support means 18 and 19, as previously discussed. In FIG. 11, spur gear support 53 is rigidly affixed to seat post 17 and extends across the underside portion of the vehicle's seat. Affixed to the ends of spur gear member 53 are left spur gear 54 and right spur gear 55. Left and right spur gears 54 and 55 are rotatably supported by spur gear support 53 by means of suitable pins or axles inserted into bushings or other apertures in spur gears 54 and 55 whereby they can freely rotate, as hereinafter described. Left spur gear connecting rod 56 is affixed to the underside of left body support member 18 by means of a pin inserted through a suitable aperture in one end of connecting rod 56 and the other end of connecting rod 56 is affixed to left spur gear 54, also by means of a suitable pin inserted through an aperture or bushing. Left spur gear connecting rod 56 is operably and rotatably connected to left spur gear 54 near the periphery of the spur gear whereby any upward or downward movement of left spur gear connecting rod 56 will cause a rotation in left spur gear 54. Similarly, right spur gear connecting rod 57 is affixed to the underside portion of right body support means 19 and to right spur gear 55 along the periphery of right spur gear 55 whereby upward and downward movement of the connecting rod will cause rotation of right spur gear 55. Right and left spur gears 54 and 55 are in mating engagement with connector gear means 58 whereby any rotational movement of one of the spur gears will be transmitted through connector gear 58 to cause an opposite rotation in the other spur gear. In the illustrated embodiment in FIG. 11, connector gear 58 is a grooved slider bar, having grooves that mate with the teeth of the individual spur gears. The slider bar can be slideably supported by means of slider sleeve 59, which is rigidly affixed to seat post 17. It will be appreciated that various other types of connector gear means can also be utilized in this embodiment of the invention, such as circular gears that mate with the individual spur gears or any other type of gear train arrangement.

In the operation of the vehicle seat illustrated in FIG. 11, as the front portion of left body support means 18 moves downwardly to pivot about pivot shaft 20, left spur gear connecting rod 56 also moves downwardly to cause a clockwise rotation in spur gear 54. As left spur gear 54 rotates in a clockwise direction, connector gear means 58 is moved toward the left, thereby causing left spur gear 55, which is in mating engagement therewith, to also rotate in a clockwise direction, thereby causing right spur gear connecting rod 57 to move upwardly. Since right spur gear connecting rod 57 is affixed to the underside portion of right seat support means 19, the front portion of the right seat support means will move upwardly. The cycle, of course, is repeated when the rider starts to depress his right leg, bringing pressure on the front portion of right seat support means 19.

Various embodiments of the invention, and particularly, the coupling means, have been set forth above. Other types of coupling means can also be utilized, such as a piston and cylinder arrangement, which can be conveniently substituted for the bellows arrangement of FIG. 10. In the piston and cylinder arrangement, cylinders could be supported from the seat post and pistons could be operably connected to the front portions of the seat support means through suitable connecting rods. A fluid conduit communicating between the cylinders could function to contain a working fluid that will be moved between the cylinder chambers to thereby cause a simultaneous movement of the front portion of each of the body support members in opposite directions.

Although it has not been specifically illustrated, it should be appreciated that the improved vehicle of this invention can have suitable adjustment means whereby the pitch, or forward slope of the seat, can be changed. Such an adjustment is quite beneficial for obtaining maximum comfort for the rider. A pivot screw and nut for affixing the body support means and coupling means to the seat post can be used for such adjustment. As in the case of conventional vehicle seats, the seat of this invention can also be adjustably raised and lowered with respect to the distance from the peddles.

As previously mentioned, the improved vehicle seat of this invention can be utilized in virtually any type of vehicle that is propelled by leg action of the rider. In addition to this utility, the seat can also be utilized for various stationary exercising devices wherein the user of the device exerts a peddling type motion.

The foregoing specification has been directed to only a few of the preferred embodiments of this invention. It will be appreciated that various modifications and changes may be made in the foregoing disclosure without departing from the spirit and scope of the invention.

We claim:

1. A vehicle seat for a vehicle propelled by leg action of the rider comprising:

(a) a seat post means adapted to be rigidly affixed to said vehicle;

(b) a right and a left body support means adapted to support the rider in a sitting position, each said body support means being pivotally affixed to said seat post means whereby the front portions of said right and left body support means can move upwardly and downwardly; and (c) a coupling means engaging said right and left body support means and adapted to move the front portions of said right and left body support means upwardly and downwardly simultaneously in opposite directions relative to each other, said coupling means comprising a shaft rotatably supported by said post means with right and left crank levers rigidly affixed to the opposite ends of said shaft and right and left connecting rods operably connecting said right and left body support means to said right and left crank levers whereby pivotal rotation of said body support means causes movement of said crank levers.

2. The apparatus of claim 1 wherein said coupling means is adapted to limit the upward and downward movement of the front portions of said right and left body support means.

3. The apparatus of claim 2 wherein said coupling means includes adjustment means adapted to adjustably limit the upward and downward movement of the front portions of said right and left body support means.

4. The apparatus of claim 1 wherein said right and left crank levers are disposed in opposite directions along the axis of said shaft.

5. The apparatus of claim 4 wherein said coupling means includes adjustment means to change the length of said connecting rods in proportion to the shin length of a rider of said vehicle.

* * * * *